L. W. STEIN.
COOKER.
APPLICATION FILED OCT. 31, 1911.
1,060,864.
Patented May 6, 1913.
2 SHEETS—SHEET 1.
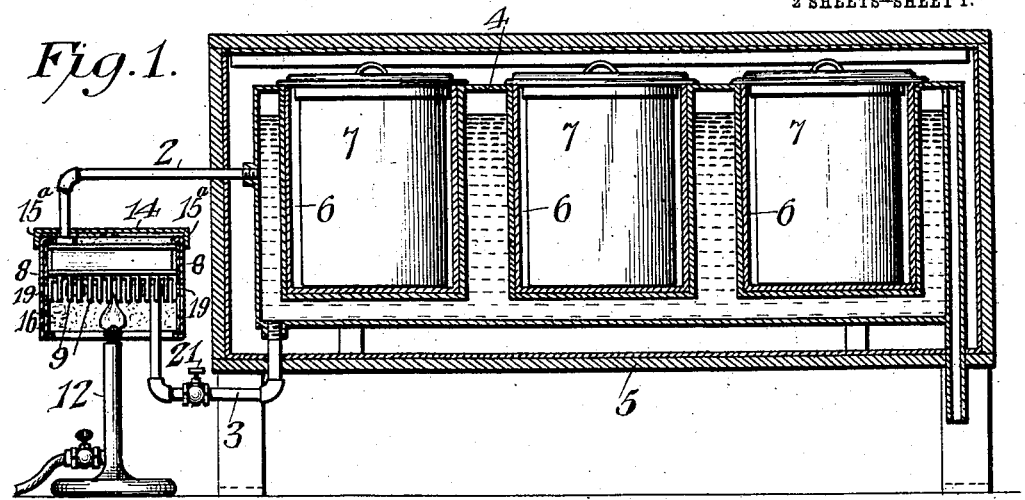
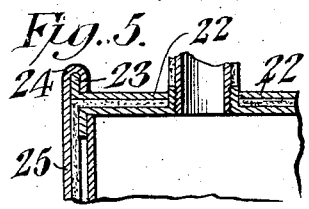 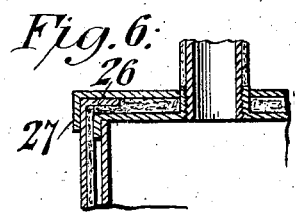
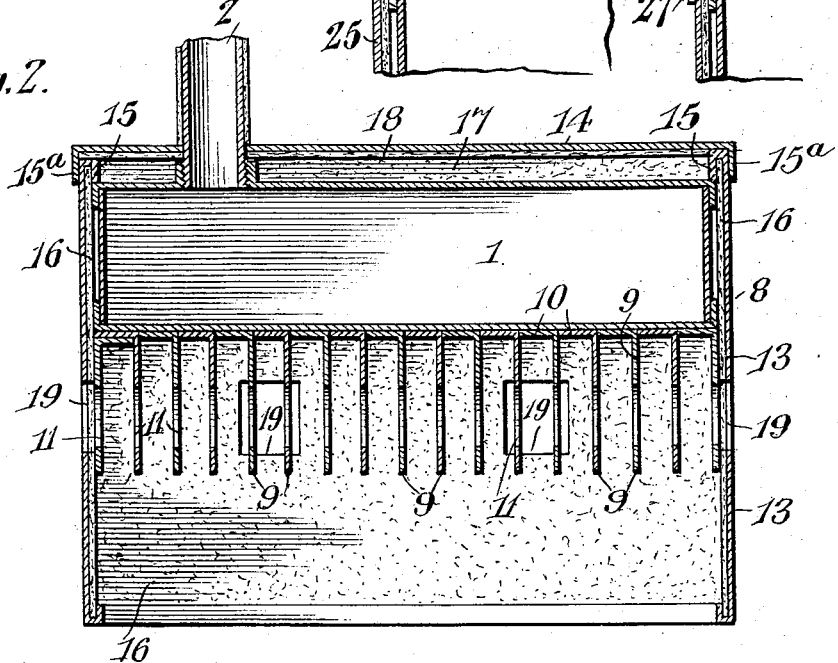
Lloyd W. Stein, Inventor
Witnesses L. W. STEIN.
COOKER.
APPLICATION FILED OCT. 31, 1911.
1,060,864.
Patented May 6, 1913.
2 SHEETS—SHEET 2.
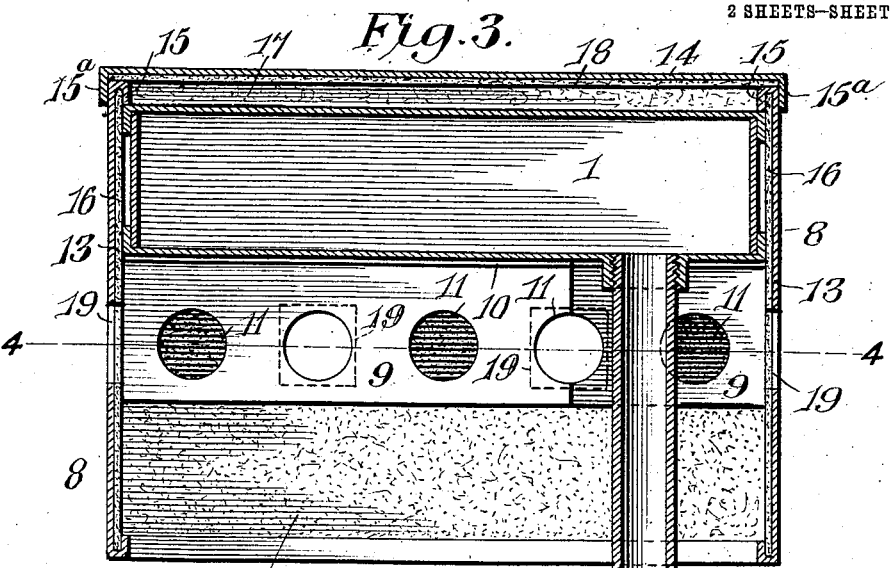
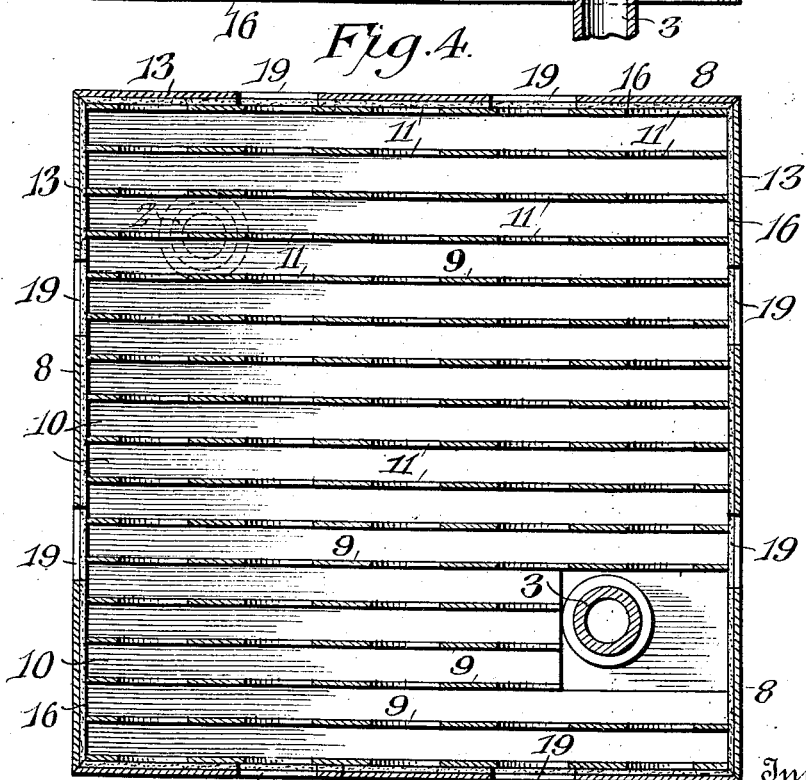
Witnesses
Jas. K. McCathran
H. T. Riley
Inventor
Lloyd W. Stein,
By E. G. Siggers
Attorney

UNITED STATES PATENT OFFICE.

LLOYD W. STEIN, OF LANCASTER, OHIO.

COOKER.

1,060,864.

Specification of Letters Patent.

Patented May 6, 1913.

Application filed October 31, 1911. Serial No. 657,900.

*To all whom it may concern:*

Be it known that I, LLOYD W. STEIN, a citizen of the United States, residing at Lancaster, in the county of Fairfield and State of Ohio, have invented a new and useful Cooker, of which the following is a specification.

The invention relates to improvements in cookers.

The object of the present invention is to improve the construction of that class of food cookers in which the cooking is effected by circulating heated water through a cabinet or casing, and to provide a water heater of simple and inexpensive construction, adapted to lessen the consumption of fuel, and capable of maintaining a uniform temperature throughout the cabinet or casing of the cooker without permitting the water within the cabinet or casing to rise to the temperature of boiling point.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a vertical sectional view of a food cooker provided with a heater, constructed in accordance with this invention. Fig. 2 is an enlarged vertical sectional view of the water heater. Fig. 3 is a similar view, taken at right angles to Fig. 2. Fig. 4 is a horizontal sectional view on the line 4—4 of Fig. 3. Figs. 5 and 6 are detail sectional views, illustrating the different ways of connecting the top and vertical walls of the outer casing or hood.

Like numerals of reference designate corresponding parts in all the figures of the drawings.

In the accompanying drawings in which is illustrated the preferred embodiment of the invention, the water heater comprises in its construction a horizontal reservoir or receptacle 1, consisting of a top, bottom and vertical walls constructed of sheet metal, or other suitable material and connected by feed and return pipes 2 and 3, an inner casing 4 of a cooking cabinet 5. The inner casing 4 of the cooking cabinet 5 is constructed of sheet metal, or other suitable material, and is composed of inner and outer shells connected together and forming an intervening space for the circulation of hot water. The inner casing is also provided with a plurality of compartments 6 for the reception of cooking utensils 7. As the specific construction of the cabinet is not claimed in the present application and as any preferred construction of cabinet may be employed, further description thereof is deemed unnecessary.

The water receptacle 1, which may be of any desired configuration, is preferably rectangular as shown, and it is arranged within a protecting hood or casing 8, and is provided at its lower face with a series of parallel heat conducting metallic plates 9, constructed of sheet metal or other suitable material and rigidly secured to and depending from the bottom of the receptacle 1 of the water heater. The parallel heat retaining and conducting plates 9, which are spaced apart to form intervening heat collecting spaces, are provided at their upper edges with attaching flanges or portions 10, and are suitably secured to the bottom of the receptacle 1, and the said plates are also provided at intervals between their upper and lower edges with alined openings 11, forming passages for the heat and adapted to permit the same to pass rapidly throughout the entire series of plates, which greatly increase the heating surface exposed to the action of the flame of a burner 12. The passages formed by the openings 11 traverse the heat collecting spaces and afford communication between the same. The parallel plates extend entirely across the reservoir or receptacle from one side to the other except at the return pipe where the plates terminate short of the adjacent side of the reservoir or receptacle to provide an open space 11$^a$ for the return pipe. The burner 12, which may be a Bunsen, or other form of burner, is relatively small, as it is unnecessary with the heat collecting, conducting and retaining plates to provide a burner having a flame covering substantially the entire area of the bottom of the water heater, and an economic cooker, which is adapted to lessen the consumption of fuel is thus provided.

The outer protecting casing or hood 8 is composed of vertical side plates or walls 13 and a horizontal top plate or wall 14 all lined with asbestos and adapted to confine the heat of the flame of the burner around the heat collecting and conducting plates. The side walls 13 of the casing 8 are preferably supported upon the top of the receptacle 1 of the water heater by seating upon the top of the reservoir or receptacle 1 the flanges 15, which embrace the asbestos lining 16, as clearly illustrated in Figs. 2 and 3 of the drawings. This spaces the top of the casing 8 from the top of the reservoir or receptacle and provides an intervening air space 17, which supplements the action of the asbestos top lining 18 in preventing the escape of the heat. The vertical walls 13 of the protecting casing or hood are provided below the receptacle or reservoir 1 with ventilating openings 19, located in the plane of the plates 9. The top 14 of the casing or hood is provided with depending marginal flanges 15ª, which fit against the outer faces of the vertical walls and retain the same in engagement with the top of the reservoir or receptacle. The lower portions of the side walls 13 are preferably imperforate, and they extend downward a sufficient distance below the lower edges of the plates 9 to form a complete shield for the flame of the burner.

In Fig. 5 of the drawings, the asbestos lined horizontal top plate or wall 22 of the outer hood or casing is arranged upon the top of the reservoir or receptacle and has its edges upturned to form projecting flanges 23, which are engaged by upper flanges 24 of asbestos lined side walls or plates 25 of the hood or casing. In this form of invention there is no air space between the horizontal top plate and the top of the reservoir or receptacle. The upper edges of the side walls or plates may be bent horizontally to form inwardly extending flanges 26, and the top wall or plate may be provided with downwardly extending vertically disposed marginal flanges 27, as illustrated in Fig. 6 of the drawings. The horizontal flanges 26 extend inwardly over the reservoir or receptacle to hang the side walls or plates therefrom, and the flanged top wall forms a cap for retaining the inwardly extending flanges of the side walls or plates in engagement with the reservoir or receptacle. In this form of the invention there is no air space between the top plate and the reservoir or receptacle, the asbestos lining filling the space between the said flanges.

In practice the feed and return pipes 2 and 3 will be covered with asbestos, or other suitable material, and the return pipe is preferably equipped with a valve 21 for controlling the circulation of water through the cooker and also to prevent a backward circulation of water when the burner is extinguished. The water within the cooker is adapted to retain heat for a considerable length of time after the burner has been extinguished. When the heater is in operation, the hot water flows from the receptacle or reservoir 1 through the feed pipe 2 into the inner casing of the cabinet, and it returns from the cabinet through the lower pipe to the reservoir or receptacle 1, and no matter how hot the water is heated within the reservoir or receptacle, it will remain below a boiling point within the cabinet, and a uniform temperature will be maintained within the same.

Having thus fully described my invention, what I claim as new and desire to secure by Letters Patent, is:—

1. A water heater for cookers arranged exteriorly of the same and including a reservoir, pipes connected with the reservoir and supporting the same at an elevation, plates secured to and depending from the bottom of the reservoir and spaced apart to form intervening heat collecting spaces, said plates being also adapted to have the flame of a burner impinge against them and form heat conductors, and a hood supported at an elevation by the reservoir and having side walls extending below the plane of the plates, said hood being open at the bottom to permit a burner to be placed beneath the reservoir.

2. A water heater of the class described including a reservoir supported at an elevation and provided with heat collecting and conducting plates connected to and depending from the bottom of the reservoir and spaced apart to form intervening heat collecting spaces, and a protecting hood comprising vertical walls provided at their upper edges with horizontal flanges projecting from their inner faces and engaging the top of the reservoir to support the vertical walls, and a top spaced from the top of the reservoir and having depending marginal flanges embracing the upper edges of the vertical walls and retaining the latter in engagement with the reservoir, said hood being open at the bottom to permit a burner to be placed beneath the reservoir and forming a shield for the burner and confining the heat.

In testimony, that I claim the foregoing as my own, I have hereto affixed my signature in the presence of two witnesses.

LLOYD W. STEIN.

Witnesses:
L. G. SILBAUGH,
CHAS. E. DELOACH.